(12) United States Patent
Gibbons

(10) Patent No.: US 9,742,890 B2
(45) Date of Patent: Aug. 22, 2017

(54) SYSTEM FOR CONTROL AND OPERATION OF ELECTRONIC DEVICES

(71) Applicant: Peter Gibbons, Carson City, NV (US)

(72) Inventor: Peter Gibbons, Carson City, NV (US)

(73) Assignee: SlapSwitch Technology, Ltd., Carson City, NV (US)

( * ) Notice: Subject to any disclaimer, the term of this patent is extended or adjusted under 35 U.S.C. 154(b) by 64 days.

(21) Appl. No.: 14/841,701

(22) Filed: Aug. 31, 2015

(65) Prior Publication Data
US 2016/0057265 A1 Feb. 25, 2016

Related U.S. Application Data

(63) Continuation-in-part of application No. 14/229,899, filed on Mar. 29, 2014, now Pat. No. 9,319,509, which is a continuation of application No. 13/186,467, filed on Jul. 19, 2011, now abandoned.

(60) Provisional application No. 61/386,114, filed on Sep. 24, 2010.

(51) Int. Cl.
| H04R 1/10 | (2006.01) |
| H04M 1/60 | (2006.01) |
| H04R 1/04 | (2006.01) |
| H04R 3/04 | (2006.01) |
| H04R 1/08 | (2006.01) |
| H04M 1/05 | (2006.01) |
| H04S 7/00 | (2006.01) |
| H04M 1/725 | (2006.01) |

(52) U.S. Cl.
CPC .......... *H04M 1/6058* (2013.01); *H04M 1/05* (2013.01); *H04R 1/04* (2013.01); *H04R 1/08* (2013.01); *H04R 1/1041* (2013.01); *H04R 1/1083* (2013.01); *H04R 3/04* (2013.01); *H04S 7/00* (2013.01); *H04M 1/72527* (2013.01); *H04R 2400/03* (2013.01); *H04R 2420/07* (2013.01); *H04R 2430/01* (2013.01); *H04R 2499/11* (2013.01); *H04S 2420/01* (2013.01)

(58) Field of Classification Search
CPC ... H04R 1/1041; H04R 1/1058; H04R 1/1066
USPC .............. 381/74, 384, 374–375; 379/420.04, 379/433.06
See application file for complete search history.

(56) References Cited

U.S. PATENT DOCUMENTS

| 6,608,908 B1 * | 8/2003 | Galet ....................... A42B 3/30 379/430 |
| 8,073,137 B2 * | 12/2011 | Weinans ............. H04M 1/6066 379/433.06 |
| 9,319,509 B2 * | 4/2016 | Gibbons ................. H04R 1/08 |

(Continued)

FOREIGN PATENT DOCUMENTS

DK WO 2010009726 A1 * 1/2010 .............. H04M 1/23

OTHER PUBLICATIONS

PandasCanEatYourTech, "Skunk Juice FG-2 Earbuds In-Depth Review", May 2, 2014, Minute 4:53 of Video.*

*Primary Examiner* — Paul S Kim
*Assistant Examiner* — Katherine Faley
(74) *Attorney, Agent, or Firm* — Patentizer™, LLC; D. C. Williams

(57) ABSTRACT

The present invention relates to the control and operation of cellular telephones and other portable electronic devices, and particularly to improvements in the functionality of those devices for use in conjunction with a variety of sports and recreational activities.

20 Claims, 6 Drawing Sheets

(56) References Cited

U.S. PATENT DOCUMENTS

| | | | | |
|---|---|---|---|---|
| 2006/0062406 A1* | 3/2006 | Kinoshita | ............... | H04R 3/00 381/113 |
| 2006/0205349 A1* | 9/2006 | Passier | ............... | H04R 27/00 455/41.2 |
| 2007/0273671 A1* | 11/2007 | Zadesky | ............... | G06F 3/0338 345/173 |
| 2008/0090524 A1* | 4/2008 | Lee | ............... | H04W 84/20 455/41.2 |
| 2009/0245539 A1* | 10/2009 | Vaudrey | ............... | H03G 7/002 381/109 |
| 2009/0252311 A1* | 10/2009 | Kuiken | ............... | G08C 17/00 379/102.02 |
| 2012/0178270 A1* | 7/2012 | McElroy | ............... | H01R 13/22 439/39 |

* cited by examiner

SYSTEM FOR CONTROL AND OPERATION OF ELECTRONIC DEVICES

CROSS-REFERENCE TO RELATED APPLICATIONS

This application is a Continuation-in-Part of pending U.S. Nonprovisional patent application Ser. No. 14/229,899, filed on Mar. 29, 2014, entitled "System for Control and Operation of Electronic Devices", which is Continuation of pending U.S. Nonprovisional patent application Ser. No. 13/186,467, filed on Jul. 19, 2011 and entitled "Sports MusiCom Headset". Both of said applications claimed benefit of U.S. Provisional Application No. 61/386,114, filed on Sep. 24, 2010, entitled "Sports MusiCom Headset". The instant application is commonly owned with, claims the benefit of, and incorporates herein by reference for all useful purposes all three of the applications enumerated above in their entireties. In this regard, in the event of inconsistency between anything stated in this specification and anything incorporated by reference in this specification, this specification shall govern.

FIELD OF THE INVENTION

The present invention relates to the control and operation of cellular telephones and other portable electronic devices, and particularly to improvements in the functionality of those devices for use in conjunction with a variety of sports and recreational activities.

BACKGROUND OF THE INVENTION

When utilizing portable personal electronic devices, including electronic music players and cellular or other mobile telephone or communication devices, it is often desirable for convenience and safety purposes to operate the devices via remote means. Further, it is often advantageous to utilize external components including speakers and microphones in conjunction with said remote means, all of which are components external to the device but are operatively connected thereto.

The external components are connected to the personal electronic device either by wires or through wireless communication. These components allow the user to operate the personal electronic device without having to handle it, or in the case of a cellular or other mobile telephone, hold it next to their ear, which would otherwise be necessary to allow the speaker and microphone to function properly. The user's hand, which would normally be used to hold the device, is then free to be used for other tasks. It also prevents fatigue of the arm that can occur when holding a telephone for extended periods of time. Furthermore, it is safer because the user's coordination and focus are enhanced for alternative purposes. This is of particular concern when the user is performing sports or recreational activities that require the continuous use of both hands, e.g. snow skiing, biking, or motorcycle riding to name a few. Finally, there is concern over the safety of radio waves emitted by cellular phones when the phones are in close proximity to the head of a user. Thus, the cellular telephone can be moved away from the user's head, thereby reducing the impact of such radiation.

Cellular telephones are often packaged with external speaker/microphone devices that allow for hands-free functionality. These devices are not always acceptable to the user. The devices often contain "ear-buds" that are uncomfortable and/or prone to disengaging with the ear and falling out, or otherwise of undesirable quality. As such, a variety of third-party products have been introduced to the market. Third-party products are produced with modified ear bud assemblies or headphones, and sometimes relocated microphones. Both wired and wireless (Bluetooth®) varieties are available.

There are three basic types of third-party devices available on the market. One type of device is a combination speaker/microphone unit connected wirelessly to the cellular telephone. A second type of device is a combination speaker/microphone unit connected to the cellular telephone using wires. A third type of device uses a wired configuration containing an integral microphone and headphone plug. This allows any standard headphone to be connected to the adapter cable, but has the drawback of requiring the use of the supplied microphone. This microphone may be inconvenient to the user due to its location along the adapter cable (including possibility of picking up excess background noise) or low quality.

A significant disadvantage of the available adapter cables is that they do not allow the use of third-party wired combination speaker/microphone units with standard, independent speaker and female phone jacks. These units are widely available for use in, among other things, communications via personal computer. Many users prefer specific devices due to comfort and functionality that suits their individual purposes. These devices cannot generally be connected to cellular telephones due to non-standard plug connections present on most models.

In particular, the Apple iPhone®, which has achieved enormous commercial success, uses a non-standard speaker/microphone female phone jack. No known adapters are available that provide standard female headphone jacks and microphone jacks to allow a standard combination speaker/microphone unit with independent male headphone and microphone plugs to be connected to an iPhone®.

Additionally, for certain sports and recreational activities where the user is in motion, many of the available devices are particularly problematic because the headsets may not be securely held in place, and free wires may snag on foreign objects such as tree branches in the vicinity of the user. In addition, microphone placement may be sub-optimal, even to the point of being non-functional, due to excessive wind noise or muffling due to the user's clothing blocking the microphone. Finally, while these devices are often equipped with remote buttons for answering incoming telephone calls, user interface with the button may be difficult due to the button's placement or configuration, especially if the user is wearing gloves or other clothing that may interfere with the operation. Answer buttons are typically very small, require a significant degree of dexterity to operate, and may even be difficult to locate in some circumstances. Due to operational difficulties, users of these devices may fail to answer incoming telephone calls that they wish to answer.

Certain devices adapted to specific sports or recreational activities have been developed to solve some of the above-mentioned issues. However, none of the presently known devices are universally adapted to a variety of non-related activities.

For instance, cold weather hats for use with, e.g. snow skiing, such as that disclosed in U.S. Pat. No. 4,982,451 to Graham, have been fitted with headphones and are connectable to portable music players. These hats are not, however, fitted with microphones and may not be connectable to cellular telephones for two-way communication. These hats are typically manufactured with heavy fabric well-suited for cold weather sports but ill-suited for warm weather activities.

Also in the prior art are helmet systems with integrated communications. U.S. Pat. No. 6,101,256 to Steelman discloses a motorcycle helmet with a built-in speaker and microphone, whereby the rider and passenger may communicate with one another. These devices are permanently mounted to the interior of the motorcycle helmet, and thus may not be adapted to uses that do not require use of the helmet.

Other known devices may have wider application but present some operational difficulties for use with sports activities. U.S. Pat. No. 6,069,964 to Yang discloses an earphone arrangement comprising a band traversing the back of the head to hold the speakers in place, and a boom microphone. This device may be less comfortable or secure than desired by a user performing sports or recreational activities, and the microphone will likely function inadequately in windy conditions.

There are no known existing solutions to address the difficulties of the present cellular telephone call answer buttons. "Walkie-talkie" type buttons, such as that depicted in International Patent Publication No. WO/2004/107787 of Bataillard, are typically mounted to the body of the transceiver or to a remote speaker/microphone device wired back to the transceiver. These devices are not ideally suited for sports and recreation activities. They are relatively bulky, heavy, and expensive to produce. Additionally, they would be more difficult to operate than the slap switch described herein.

What is needed, therefore, is a universal audio control device functional for a variety of sports and recreational activities. The headset, speaker, and microphone should be securely held in place, even while the user is in motion. The microphone should be placed in a position that will enhance the pickup response while limiting the interference from wind, clothing, or the like. A breakaway connector between the cellular telephone and headset would prevent potentially dangerous or destructive snags on foreign objects and further provide the user with the ability to disengage the headset portion from the remaining components of the device. The headset itself would secure the earphones and microphone in place on the wearer's head comfortably even while wearing a helmet or other headgear over it. Additionally, an answer button in the style of a "slap switch" should be included to facilitate its operation even while the user is wearing, e.g. heavy gloves. Ideally, this headset control system would be suitable for both cold and warm weather activities. Moreover, the headset control system could also be used to listen to music since many modern cellular telephones are also portable music players.

Additional functionality would be realized by incorporating an adapter cable that would allow the user to connect independent headphones and microphones of their choice to their cellular telephone. The slap switch may also be incorporated into the adapter. A further benefit would be provided by supplying "patch" cables that allow the adapter to be connected to a variety of common cellular telephone models.

In conclusion, no cellular telephone or portable electronic device control system exists that meets the above design criteria, particularly in the configurations disclosed herein.

SUMMARY OF SOME ASPECTS OF THE INVENTION

It is an object of the present invention to provide embodiments of a control system suitable for use with cellular telephones or other portable electronic devices, one or more speaker(s), and one or more microphone(s), said control system suitable for use in conjunction with a variety of sports and recreational helmets and hats.

It is envisioned that the present invention is fully adaptable to all manners of portable electronic devices, including but not limited to cellular telephones, non-cellular mobile phones, satellite phones, cordless wireless phones, walkie-talkies, portable music players, and the like. Certain embodiments of the invention are suitable for use with other communication devices, including but not limited to two-way portable radio devices. Certain embodiments may be particularly applicable and useful to the special needs of law enforcement, search and rescue, and other official personnel. Without limitation, these and other embodiments may be realized without departing from the spirit and scope of the present invention. A person of ordinary skill in the art will immediately appreciate additional embodiments of this invention beyond those specifically taught herein, and this disclosure is intended to apply to all such embodiments without limitation upon the scope thereof. For example, whenever the phrase "cellular telephone" is used henceforth to permit a concise disclosure, it is intended to represent any communication device or other personal or portable electronic device with which the invention may be compatible. Similarly, the phrases "portable electronic device" and "personal electronic device" are intended to encompass all manner of such devices including cellular telephones and any other personal communication devices.

Speaker(s), microphone(s), and vibration sensor(s) utilized with the control system of the present invention are devices external to a portable electronic device that are held in place by any known means, including but not limited to adhesives, hook and loop fasteners (e.g., Velcro®), or the like. Alternately, said devices may be securely but removably disposed within openings or pockets of a stretchable head garment comprising a thin fabric so the devices may be easily separated to permit the head garment to be washed. The head garment is ideally constructed of a breathable material, making it suitable for warm weather use without overheating the user. Other headgear, including but not limited to a motorcycle helmet, bicycle helmet, or ski hat may be placed over the head garment as desired by the user.

The head garment preferably comprises a fabric hood comprising a neckband which overlaps the neck of the user below the chin. One or more audio output devices, typically comprising speakers, may be placed on or within the fabric hood proximate to the user's ears while one or more audio input device(s), typically comprising acoustic microphone (s) or vibration sensor(s), are ideally placed on or within said neckband such that the microphone(s) or vibration sensor(s), either directly or via a thin intervening layer of neckband fabric, are held in direct contact with the user's neck immediately proximate to the user's larynx for optimum sensitivity, audio clarity, and maximal protection from interference caused by wind, clothing, and other factors.

In one embodiment, audio of the user's voice is transmitted to the acoustic microphone(s) via acoustic transmission of sound (compression and rarefaction of air). In one embodiment, audio of the user's voice is transmitted to the acoustic microphone(s) or vibration sensor(s) via conduction through the solid matter of the user's body rather than through compression and rarefaction of air. Depending on their design and configuration, acoustic microphones may be suitable for use both as acoustic microphones and as vibration sensors, but specialized vibration sensors comprising one or more of piezoelectric crystal(s), piezoelectric polymer(s), dynamic element(s), condenser element(s), or other transducer technology incapable of also serving as acoustic microphones are envisioned to be within the scope of this invention. Vibrations of the user's larynx are directly sensed by the one or more acoustic microphone(s) or vibration sensor(s) and converted into electrical signals thereby. Sound transmission via vibration conduction provides greater sensitivity and largely eliminates the pickup of background noise, thereby improving clarity of transmission over acoustic transmission. Said acoustic microphone(s) or vibration sensor(s) may also comprise specific design features, including but not limited to highly directional sensitivity, thereby further minimizing audio degradation from external sources such as wind. Further, the use of direct contact vibration sensing in lieu of acoustic transmission permits use of this technology in high moisture environments including in or under water when implemented with suitably designed devices such as plastic-encapsulated piezoelectric transducers impervious to moisture, where acoustic reception of sound via a conventional acoustic microphone is not practicable.

In one embodiment, one or more acoustic microphone, one or more vibration sensor, or one or more acoustic microphone and one or more vibration sensor may be deployed simultaneously in conjunction with the control system disclosed herein. Simultaneous use of more than one microphone or vibration sensor would provide redundancy and superior audio performance under extreme body movement typical of many sporting or recreational activities to which this invention is directed. In one embodiment, one or more acoustic microphone(s) may be deployed in conjunction one or more vibration sensor(s) and the different audio signals used to provide noise cancellation functionality via known phase reversal techniques prior to summation or via other means. In an embodiment where more than one acoustic microphone and more than one vibration sensor are deployed simultaneously, they may be proximate to each other or placed at different locations to optimize performance with respect to audio performance, noise cancelation, and the like.

In one embodiment, audio processing circuitry may be provided to improve the quality of audio obtained from the one or more acoustic microphone(s) or vibration sensor(s), including but not limited to automatic gain control, compression, limiting, noise gating, equalization, and the like. The parameters of said audio processing, including but not limited to input level(s), output level(s), dynamic range(s), signal to noise ratio(s), background noise threshold(s), audio frequency passband(s) defined by high pass filter(s) and low pass filter(s), notch filtering, or the relative audio gain of any frequency range with respect to any other frequency range(s) may either be fixed or adjustable. In one embodiment, audio processing circuitry as described above may be provided to improve the quality of audio obtained from the cellular telephone or other portable electronic device.

Speakers of the normal acoustic type, which convert electrical audio signals into compression and rarefaction of air to produce audible sounds, are typically provided in certain embodiments of this invention. In one embodiment, speakers operatively connected to the control system may comprise one or more driven vibration transducers in vibrational communication contact with the user's body. In a manner similar to that of the vibration sensors discussed above, a driven transducer element affixed to a users body may convey an audio signal to a user's inner ear directly via conduction via the solid matter of a user's body. In one embodiment, driven transducer elements may be affixed to or within the hear garment so that they are in direct contact with the user's head at one or more desired location(s). Preferably, the driven transducer element(s) may be placed in contact with the user at or near the user's temples, against the user's skull above or behind the user's ears, or an any other location determined to be optimal for the intended purpose. In one embodiment, driven transducer element(s) may be placed at one or more locations on the user's body other than those covered by the head garment, including but not limited to the user's collarbone or shoulders. In one embodiment, an additional garment may be provided to hold the driven transducer element(s) in position in a manner similar to that described above in which the devices are held in position by the head garment. In one embodiment, the driven transducer element(s) may be directly affixed to the user's body at any preferred location via a suitable removable adhesive. This embodiment may be preferred for applications in which a head garment or other body covering would be uncomfortable or impractical.

For the balance of this disclosure, the term "microphone" wherever used is intended to encompass both acoustic microphones and vibration sensors of any type and in any number, and the term "speaker" wherever used is intended to apply to both acoustic speakers and driven transducer element(s) of any type and in any number.

It is another object of the invention to provide a control system that enhances the ability of users to operate the portable electronic device, such as to answer or terminate cellular telephone calls, while the user is in motion or wearing gloves that would render the use of conventional call answer buttons difficult or impossible. One embodiment of a control device comprises at least one actuation surface accessible to a user and susceptible force applied by said user (hereinafter referred to as the "movable surface") proximate to at least one other surface (hereinafter referred to as the "non-movable surface") such that the force applied by the user results in relative translational motion by the movable surface toward the non-movable surface when a sufficient component of the applied force is present. Said movable surface is sometimes referred to herein as a "slap pad", the non-movable surface is sometimes referred to herein as the "base", and the control device comprising the movable slap pad surface, the non-movable base surface, and any other components, devices, or structure comprised within, between, or permanently attached to either surface, directly or indirectly, is referred to collectively as the "slap switch control device". Said slap switch control device is configured to operate one or more momentary electrical switches or contacts disposed within or between the non-movable and movable surfaces, or cause conductive surfaces of the movable and non-movable surfaces to touch, thereby establishing a path of electrical continuity whenever a sufficient activation force is applied to said movable surface, and then return to its pre-activation position when the activation force is removed.

In one embodiment, the one or more momentary electrical switches or contacts comprise normally-open switch contacts that provide no connection (an open circuit) between said switch contacts in an unactivated state and provide an electrical connection (electrical continuity, or a closed circuit) between said switch contacts in an activated state. In one embodiment, the one or more momentary electrical switches or contacts comprise normally-closed switch contacts that provide an electrical connection (electrical continuity, or a closed circuit) between said switch contacts in an unactivated state and provide no connection (an open circuit) between said switch contacts in an activated state.

The slap switch control device may comprise a plurality of movable surfaces where each surface is independently operative. In one embodiment, each movable surface may be operatively connected to one or more of the one or more electrical switches or contacts on an exclusive basis. That is, certain electrical switches or contacts may be operated only by activation of one of the plurality of movable surfaces. In one embodiment, each movable surface may be operatively connected to all of the plurality electrical switches or contacts on a non-exclusive basis. That is, all electrical switches or contacts may be operated by activation of any of the plurality of movable surfaces.

Said slap switch control devices may be used, for example, to answer a telephone call using a cellular telephone device operatively connected thereto. For example, in one embodiment suited for certain cellular telephone devices, a call may be answered on some cellular telephone devices by momentarily shorting the two conductors of the microphone connection upon activation of the slap switch control device when such conductors are connected to normally open contacts of one or more electrical switches or contacts disposed within said slap switch control device.

Ideally, the slap switch control device would be relatively large compared to prior art cellular telephone answer switches but compact enough to avoid excessive bulkiness. In one embodiment, the active surface area suitable for engaging the control device is at least one square inch. In another embodiment, said active surface area of the control device may be greater than one square inch. An active surface area of approximately four square inches is preferable, and the active surface area may range in sizes up to nine square inches or larger. The size of the slap switch control device minimizes the need for precision, making the device suitable for use with sports and recreational activities. In another embodiment particularly suitable for specialized applications, the active surface area of the control device may be less than one square inch to fit within a limited, defined space. The control device may comprise any size and shape desired, and the specific size and shape of the control device in the form of a slap switch may be conformed to any specific requirements or preferences, particularly in a manner to optimize performance of any embodiment directed toward a specific application. The size and shape of the control device avoids the need for the user to search for the device and fumble with the operation thereof.

The slap switch control device may be located and deployed in any desired manner. For example, the slap switch control device may be removably affixed in any known manner to a garment worn by a user. Preferably, the control device will be affixed to an outer garment where the switch is directly accessible for activation by the user. However, in one embodiment, the control device may be affixed to an inner garment and the switch activated by a force applied by the user through any intervening outer garments. This embodiment may be preferred under hostile conditions where the control device may be subject to damage or inadvertent activation from external forces. The size, shape, and activation sensitivity of the control device in this embodiment may be modified specifically for use on an inner layer of clothing.

The slap switch control device may be clipped onto the users clothing, enclosed within a special pouch or flap provided on a garment, affixed via hook-and-loop fasteners, attached via a removable adhesive, or held in place via magnetic force between a suitably strong magnet located on the back surface of the control device and a plate typically comprised of stainless steel or other magnetically-attracted material with the garment material trapped between the magnet and the plate. Alternately, the magnet may be in the form of a removable plate and the back surface of the control device may be comprised of stainless steel or other magnetically-attracted material. By capturing the garment material between a magnet and magnetically-attracted material, the control device may be securely fastened to a garment at a preferred location but easily repositioned or removed at will without damage to the garment. In another embodiment, the control device may be placed inside a typical garment pocket or situated in any other preferred location without being affixed or fastened to the user, if desired.

In one embodiment, the control device may be securely fastened to a wristband, headband, hat, belt, or other dedicated mounting apparatus to be worn by the user. In one embodiment, the control device may be securely fastened directly to the user via a suitably removable adhesive.

In one embodiment of the invention, input devices such as one or more microphones, control devices comprising some number of any of switches, cables, connector jacks, circuitry, and other structure complementary or incidental to such elements as described in detail herein, and output devices such as speakers and headphones are operatively connected via one or more wired connections. In this embodiment, all audio output provided by the cellular telephone or other portable electronic device is first communicated to the control device and subsequently communicated from the control device to any speakers or headphones connected thereto. Similarly, all audio input provided by the microphone(s) or vibration sensor(s) is first communicated to the control device and subsequently communicated from the control device to the cellular telephone or other portable electronic device connected thereto. The control device functions both as an audio distribution device and, as described elsewhere herein, as a device to permit the user to control any connected devices and direct how said audio is distributed.

In one embodiment, the control device may comprise one or more acoustic microphones or vibration sensors operational to replace similar external devices described above. If deployed proximate to a users larynx, such as being mounted on or within the head garment neckband in contact with the user's throat, affixed to the collar of the user's inner or outer garment, or affixed or attached in any manner to a user's head or chest, either an acoustic microphone or vibration sensor properly configured and disposed within said control device would be functional to receive either transmitted sound or vibrational information to be communicated to the cellular telephone or other portable electronic device utilized with the control device.

It is another object of the invention to provide one or more breakaway connectors disposed along any wire(s) or cable (s) of the system where desired. In one embodiment, the breakaway connector comprises two "halves" containing a plurality of electrical contact elements and one or more magnets to hold the halves in place during normal operation. In one embodiment, the two halves of the breakaway switch are not identical in every manner and comprise separate male and female halves configured for proper connectivity. In one embodiment, the two halves of the breakaway connector are identically configured in such a manner as to be operatively connectable; that is, each half of the breakaway connector is physically identical in every way but are configured for proper connection.

In one embodiment, a breakaway connector is disposed between the head garment and the slap switch control device to prevent user injury due to snagging or other accidental forces applied to other portions of the system. In this embodiment, the breakaway connector is disposed along the cable connecting the slap switch control device and the speakers and microphone of the headset, with one of the two connector halves disposed at the ends of each of the cable segments from each device where they connect. In this manner, any force applied to the control device or any cable connected on the control device side of the breakaway connector will cause said breakaway connector to separate, preventing said excessive force from being applied to the speakers and microphones affixed to or near the user's head and thereby averting potential injury.

In one embodiment, a breakaway connector may be disposed along the cable connecting the slap switch control device to the cellular telephone or other portable electronic device, with one of the two connector halves disposed at the ends of each of the cable segments from each device where they connect. In this manner, any force applied to the control device or any cable connected on the control device side of the breakaway connector will cause said connector to separate, preventing said excessive force from being applied to the cellular telephone or other portable electronic device and potentially averting potential damage thereto.

In one embodiment, a first breakaway connector may be disposed along the cable connecting the slap switch control device and the speakers and microphone of the headset, and a second breakaway connector disposed along the cable connecting the slap switch control device to the cellular telephone or other portable electronic device.

It is another object of the present invention to provide a wired adapter comprising a standard (3.5 mm) female phone jack with an audio input/output plug on the opposite end suitable for use with cellular telephones or other portable electronic devices that will allow operation with a standard headset of the user's choice. A slap switch control device may also be incorporated into the adapter. This will allow use of the slap switch control device with a user's preferred headset in the case that the user elects to use alternate speaker and microphone devices, such as a third party headset or headphones, than those disclosed in certain embodiments herein. Two independent connections are therefore provided: one standard headphone connector, and one standard microphone connector. These independent connections can be located adjacent to one another in a duplex arrangement or on separate wires branching off of the cellular telephone connection in a simplex arrangement.

In one embodiment, a plurality of any of jacks, connection ports, communication ports, or wire pigtail connections may be provided on the slap switch control device for various purposes, including but not limited to establishing one or more communication connections to external devices, providing audio input to the system from one or more external sources, receiving audio output from the system for connection to one or more external devices or speakers, permitting connection of additional control devices, transmission or reception of control signals, transmission or reception of data or configuration information, or for any other useful purpose. For example, more than one headphone jack may be provided to permit a user to share audio with one or more other user(s) by simply plugging in a second headset or other external speakers. Similarly, one or more other users may participate in a cellular telephone call by plugging in one or more suitable headset comprising one or more speaker(s) and microphone(s). In one embodiment, additional control devices, including but not limited to additional slap switch control devices or switches of any other nature, may be connected to a slap switch control device via any of the plurality of any of jacks, connection ports, communication ports, or wire pigtail connections to provide additional operational flexibility. One or more of the wired pigtail connections depicted in the drawings may be replaced by a jack installed in the control device and a cable comprising a compatible plug supplied in its place. This would permit substitution of components or cables to provide increased versatility of operation and the ability to replace any damaged cables or other components as may be required. The plurality of control system jacks and connection ports preferably comprise industry standard connectors commonly used in other equipment to permit direct connection of said equipment with readily available interconnect cables. In the event that non-standard control system jacks and connection ports are provided, perhaps for economy of space or other operational considerations, suitable adapters or adapter cables may be provided to ensure compatibility with a wide variety of external devices or sources. Similarly, in another embodiment of the present invention, "patch" cables are provided to allow use of the control system with different cellular telephone models, which may contain nonstandard audio input/output connections.

In one embodiment, input devices such as one or more microphone(s), control device(s) such as switch(es), and output device(s) such as speakers and headphones may be operatively connected via one or more wireless connection(s) in lieu of connection via wire(s) or cable(s). Said wireless connections may be established via any known or later-developed wireless communication technology or protocol, including but not limited to Bluetooth®, ZigBee®, Wi-Fi® (generally comprising the family of IEEE 802.11 protocols), Near Field Communication (NFC), and the like. Multiple connections may be established using the same communication technology or protocol, or more than one communication technology or protocol may be used simultaneously for similar or different purposes. For example, audio may be communicated from the device to the system via Bluetooth® while one or more control connections may be transmitted or received by the system via NFC.

In one embodiment, all of the connections between the one or more microphone(s), control device(s), and output device(s) such as speakers and headphones are wired connections. In one embodiment, a first portion of the connections between the one or more microphone(s), control device(s), and output device(s) such as speakers and headphones may be wired connections and a second portion of said connections may be wireless connections. In this manner, an appropriate combination of wired and wireless connections may be utilized for maximum convenience and flexibility. In one embodiment, all of the connections between the one or more microphone(s), control device(s), and output device(s) such as speakers and headphones are wireless connections.

As disclosed above with respect to the embodiment comprising wired connections, in one embodiment where all connections comprise wireless communication connections, all audio output provided by the cellular telephone or other portable electronic device is communicated to the control device via a first wireless communication connection and subsequently communicated via at least a second wireless communication connection from the control device to any speakers or headphones connected thereto. Similarly, all audio input provided by the microphone(s) or vibration sensor(s) is communicated to the control device via at least a second wireless communication connection and subsequently communicated via at least a first wireless communication connection from the control device to the cellular telephone or other portable electronic device connected thereto. The wireless communication connections preferably allow communications in both directions with respect to each connected device (to and from), but embodiments where wireless communication connections operate in one direction only are also envisioned by this disclosure. The control device in this embodiment also functions as both a wireless audio distribution device and, as described elsewhere herein, as a device to permit the user to control any connected devices and direct how said audio is distributed via one or more wireless communication connection(s).

These and other features and advantages of this invention will be more readily understood from the following detailed description of the various aspects of the invention.

BRIEF DESCRIPTION OF THE DRAWINGS

Certain aspects of the features and advantages of the invention are disclosed in the following drawings, wherein.

Figure 1:
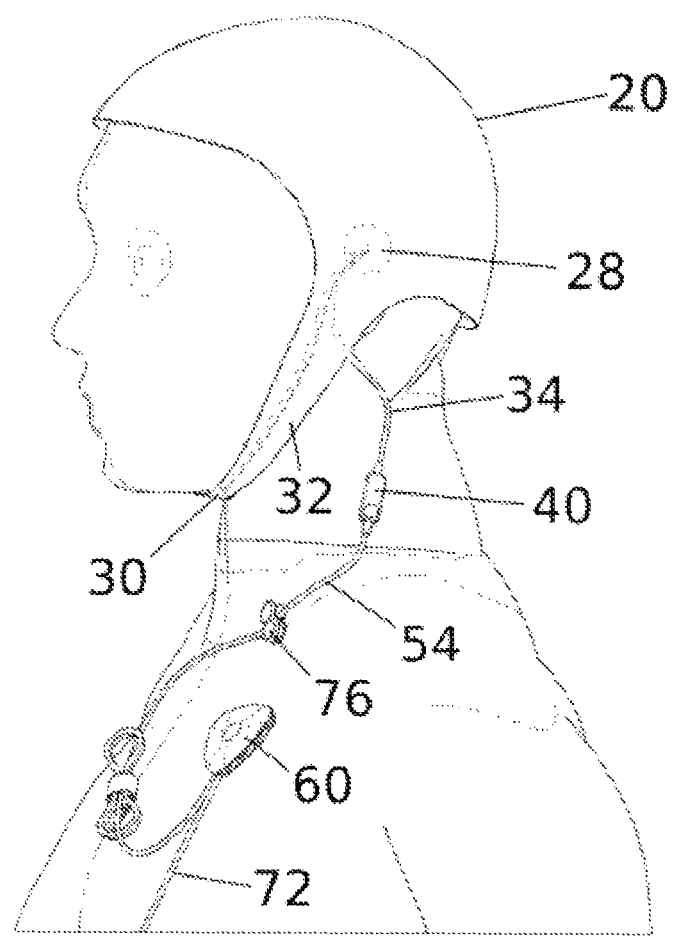
FIG. 1 is a perspective view of one embodiment of the present invention showing the control system utilized with a headset worn by a user.

It is noted that the drawings of the invention are not to scale. The drawings are merely generalized representations and are not intended to portray all specific parameters of the invention. The drawings are intended to depict only certain embodiments of the invention, and therefore should not be considered as limiting the scope of the invention. In the drawings, like numbering represents like elements among the drawings. In other words, for the sake of clarity and brevity, like elements and components of each embodiment bear the same designations throughout the description.

DETAILED DESCRIPTION OF THE INVENTION

FIG. 1 depicts one embodiment of the wired headset system wherein head garment 20, fabricated from stretchable fabric or the like, is secured to a user's head preferably through the use of hook-and-loop fasteners (e.g., Velcro®) on neckband 32 or via other suitable means known in the art. Left and right speakers 28 are mounted within head garment 20 proximate to the user's ears (only the left speaker is shown in FIG. 1). Microphone 30 is mounted within neckband 32 and held against the user's neck near the larynx. Connecting wires (not shown) for speakers 28 and microphone 30 are preferably contained within or attached to head garment 20 and neckband 32. Wire 34 connects speaker 28 and microphone 30 to breakaway connector 40. In a preferred embodiment, speakers 28, microphone 30, and connecting wires are contained in secure pockets of head garment 20 but are removable by the user to facilitate washing of head garment 20.

Breakaway connector 40 is designed to release wire 34 from wire 54 in the event that excessive tension is placed on the line (e.g., from a snag) or if the user desires to separate head garment 20 and associated components from the remaining components of headset 10. Slap switch control device 60 is used to answer or terminate telephone calls and to start and stop music, and has the advantage of being easy to operate when the user is participating in sports or recreational activities, especially where the particular activity would render it difficult or impossible to toggle a micro switch. Slap switch control device 60 is connected to cellular telephone plug 74 by wire 72.

Figures 2, 3:
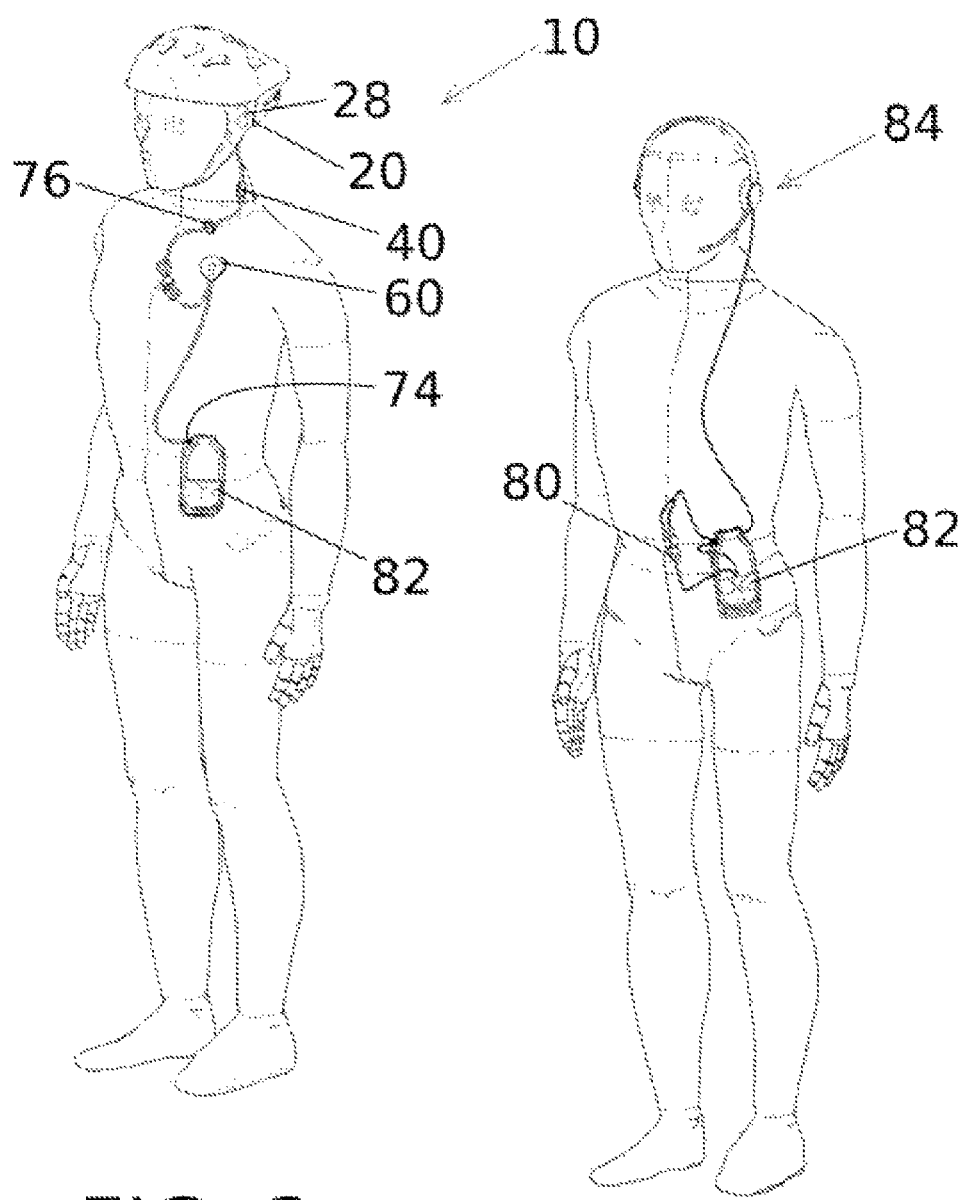
FIG. 2 is a perspective view of one embodiment of the present invention showing the control system in conjunction with a headset worn by a user underneath a helmet.
FIG. 3 is a perspective view of one embodiment of the present invention showing use of the present invention in conjunction with a standard headset.

FIG. 2 depicts headset 10 secured to a user, with an optional sports helmet (not part of the present invention) worn over top of head garment 20. Headset 10 comprises head garment 20, breakaway connector 40, wire clip 76, slap switch control device 60, and cellular telephone plug 74. An optional carrying case 82 (also not part of the present invention) encapsulates the cellular telephone. One or more additional breakaway connectors 40 (not shown) may also be provided with this embodiment, including but not limited to one disposed between slap switch control device 60 and cellular telephone plug 74, if desired.

FIG. 3 depicts another embodiment of the present invention. Again, an optional carrying case 82 is shown. Female duplex plug 80 comprises standard (3.5 mm) headphone and microphone connections. Female duplex plug 80 may alternatively be comprised of two simplex plugs. User-selected headset 84 (not part of the present invention) is worn by the user and connected to female duplex plug 80. Slap switch control device 60 is contained within a pouch that is part of optional carrying case 82 and is therefore not explicitly depicted in FIG. 3. Slap switch control device 60 may also be attached to a user's clothing as shown in FIG. 2, if preferred by the user. One or more additional breakaway connectors 40 (not shown) may also be provided with this embodiment, including but not limited to one disposed between headset 84 and female duplex plug 80, if desired. Similarly, standard 3.5 mm speaker and microphone connections, as shown in FIG. 3, may be incorporated into the headset system of FIG. 2. The resulting system would, therefore, be compatible both with head garment 20 and any standard headset selected by the user, thereby allowing the user to select the most suitable headset arrangement for a given situation.

Figure 4:
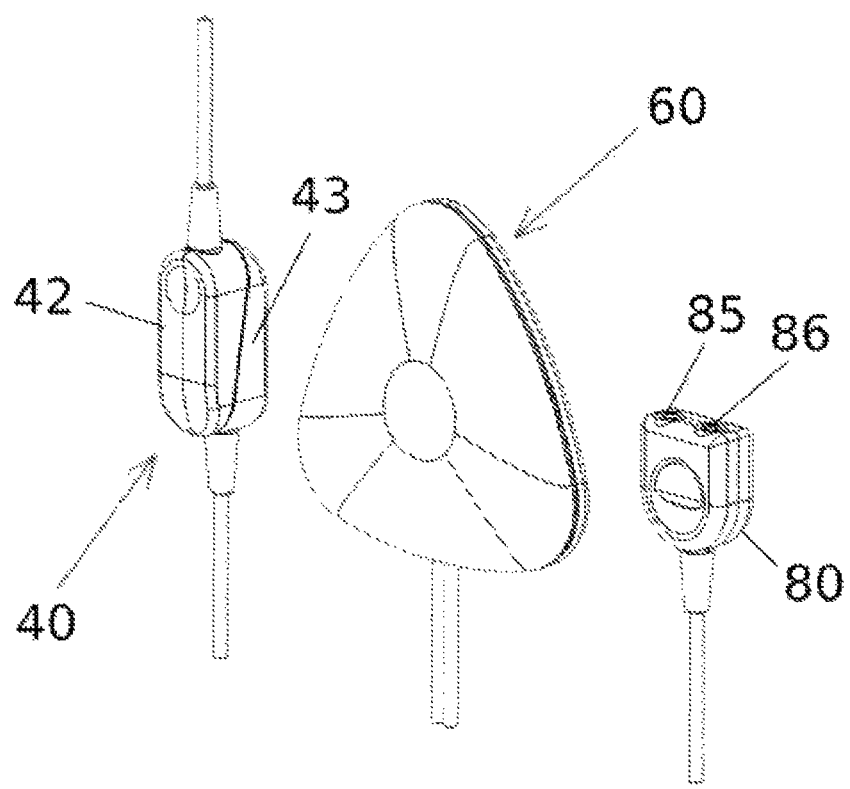
FIG. 4 is a perspective view of one embodiment of the breakaway connector, the slap switch control device, and the duplex female phone jack.

FIG. 4 shows a perspective view of certain embodiments of breakaway connector 40, slap switch control device 60, and female duplex plug 80. In one embodiment, breakaway connector 40 comprises male connector half 42 and female connector half 43, each with internal electrical contacts and one or more retaining magnets. In one embodiment, the connector halves 42 and 43 of breakaway connector 40 also comprise internal electrical contacts and one or more retaining magnets but are physically and operationally identical and are not distinguishable as being either "male" or "female". FIG. 4 shows that the plane of connection between connector halves 42 and 43 of breakaway connector 40 is disposed at an acute angle with respect to the line defining the cables connected to said connector halves when the connected cable is taut. Said plane of connection lies at an angle between 0° (collinear with or parallel to the taut cable) and 90° (normal or perpendicular to the taut cable), thereby comprising an acute angle.

Slap switch control device 60 is shown in a substantially triangular shape, although one of ordinary skill in the art can appreciate that a variety of shapes are possible. Female duplex plug 80 comprises speaker plug 85 and microphone plug 86. An alternative embodiment employs two female simplex plugs in place of female duplex plug 80.

Figure 5:
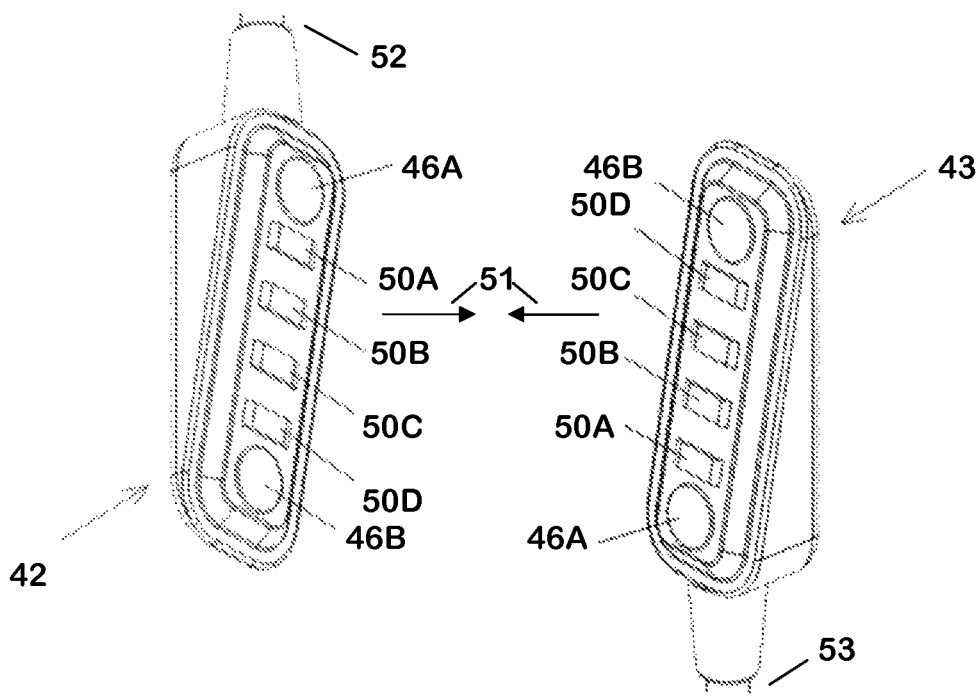
FIG. 5 is a perspective view showing the two identical halves of one embodiment of the breakaway connector properly positioned for connection.

FIG. 5 shows one exemplary embodiment of breakaway connector 40 comprised of identical half connectors 42 and 43 depicted in the relative positions for proper connection. Magnets 46A and 46B and contact surfaces 50A-50D are equally positioned on the faces of both halves of the connector and of compatible composition and configuration. This identical nature of connector halves is markedly different than most other connectors known in the art which comprise non-identical male and female components, typically a male "plug" and a female "jack". Connection is achieved by moving the connector halves toward each other in the directions depicted by motion indicators 51. Said half connectors 42 and 43 comprise magnets 46A and 46B of opposite polarity and electrical contacts 50A, SOB, SOC, and SOD. Half connectors 42 and 43 are held together by the attractive force of magnets 46A and 46B, one of which is configured with the "north pole" face exposed and the other configured with the "south pole" face exposed. Both magnets 46A are configured identically and both magnets 46B are configured identically. For example, if both magnets 46A are configured with the "north pole" exposed on the face of the half connector, both magnets 46B are configured with the "south pole" exposed on the face of the half connector. Since the connector halves are connected with their principal axes rotated by 180° so that the wires 52 and 53 terminating in the connector halves describe line segments that are essentially collinear or parallel when connected (also see FIG. 4), each of the "north pole" magnets 46A of this example are aligned and in contact with each of "south pole" magnets 46B at each end of the half connector faces and the attractive magnetic force therebetween retains connector halves 42 and 43 firmly affixed to each other. Additional symmetrical features may be included to provide additional stability of the connection, such as providing a protruding rim around each magnet 46A that fits within a recessed area around each magnet 46B. This opposite-polarity magnet configuration not only provides a reliable and effective connection when properly positioned but also prevents inadvertent improper connection, as magnets 46A will repel each other while magnets 46B will also repel each other if the breakaway connector halves are positioned improperly.

When said connector halves are properly connected as depicted in FIG. 4 and FIG. 5, continuity between electrical contacts 50A-50D is achieved and maintained. Specifically, and as depicted in FIG. 5, contact 50A from connector half 42 will be in operative electrical communication with contact 50D from connector half 43, contact 50B from connector half 42 will be in operative electrical communication with contact 50C from connector half 43, contact 50C from connector half 42 will be in operative electrical communication with contact 50B from connector half 43, and contact 50D from connector half 42 will be in operative electrical communication with contact 50A from connector half 43. These contact assignments may be assigned to the desired electrical or control signals passed through the breakaway connector such that the desired continuity is achieved. Electrical contacts may comprise any desired configuration to achieve reliable continuity across breakaway connector 40. Although four electrical contacts are described in this embodiment, any desired number of electrical contacts may be provided as desired in other embodiments of the invention.

An important feature of the embodiment of breakaway connector 40 depicted in FIG. 4 and FIG. 5 is the fact that the faces of each identical contact join in a plane disposed at an acute angle to the cables emanating from the breakaway connector 40 when the halves are attached. This configuration provides significant advantage over other configurations and is particularly well-suited for a reliable magnetic connection. Given that the principal magnetic forces holding connector halves 42 and 43 together is normal (perpendicular) to the plane of the magnet faces in direct contact, said acute alignment of the plane of connection with respect to the line described by the connected cables when taut provides both a normal and longitudinal component of magnetic force, thereby providing an optimal connection while maintaining full breakaway capability. Magnets 46A and 46B are selected to provide sufficient attractive force to maintain a reliable physical connection while simultaneously providing the ability to separate from each other when an appropriately strong force is applied across the connection.

In one embodiment, electrical contacts 50A-50D (or any number of electrical contacts desired) may comprise magnetic materials, thereby providing multiple attractive forces distributed across the entire face of the connector halves operative to hold said connector halves 42 and 43 together. Polarity of any such magnetic electrical contacts must also be properly configured if connector halves 42 and 43 are to be identical. For example, in the embodiment presented in FIG. 5, contact 50A in both connector halves may be configured with the "north pole" face exposed and contact 50D in both connector halves configured with the "south pole" face exposed. Similarly, contact 50C in both connector halves may be configured with the "north pole" face exposed and contact 50B in both connector halves configured with the "south pole" face exposed. In his manner, each of the magnetic electrical contacts 50A-50D in connector halves 42 and 43 will connect to electrical contacts of the opposite polarity ("A" contacts to "D" contacts exclusively and "B" contacts to "C" contacts exclusively) and both connector halves will remain identical in every way. In one embodiment, the surfaces of magnetic electrical contacts 50A-50D are specially fabricated, coated or plated with an additional material, or alternatively processed in any desired manner known in the art to provide optimal conductivity when connected. Magnetic electrical contacts 50A-50D may be utilized in conjunction with, or in lieu of, magnets 46A and 46B as may be desired or deemed most suitable for any specific application.

As depicted in FIG. 4 and particularly in FIG. 5, wires 52 and 53 are permanently attached to connector halves 42 and 43 of breakaway connector 40 via molded strain reliefs. In one embodiment (not shown), said permanent molded wire connections are replaced by multi-conductor connector jacks embedded within connector halves 42 and 43 to permit a suitable cable with a compatible multi-connector plug to be plugged therein. In this embodiment, the cables terminating in connector halves 42 and 43 would be provided with said multi-connector plugs in addition to the now-removable connector halves into which said plugs would be inserted. The flexibility of providing one or more removable breakaway connectors would permit users to forego the use of such breakaway connectors if desired by plugging wire 34 connected to speaker 28 and microphone 30 directly into slap switch control device 60, where an appropriate jack may be provided as described elsewhere herein, in lieu of the connector half, or to replace any connector half in the event of physical damage or electrical failure to the connector half.

Figure 6:
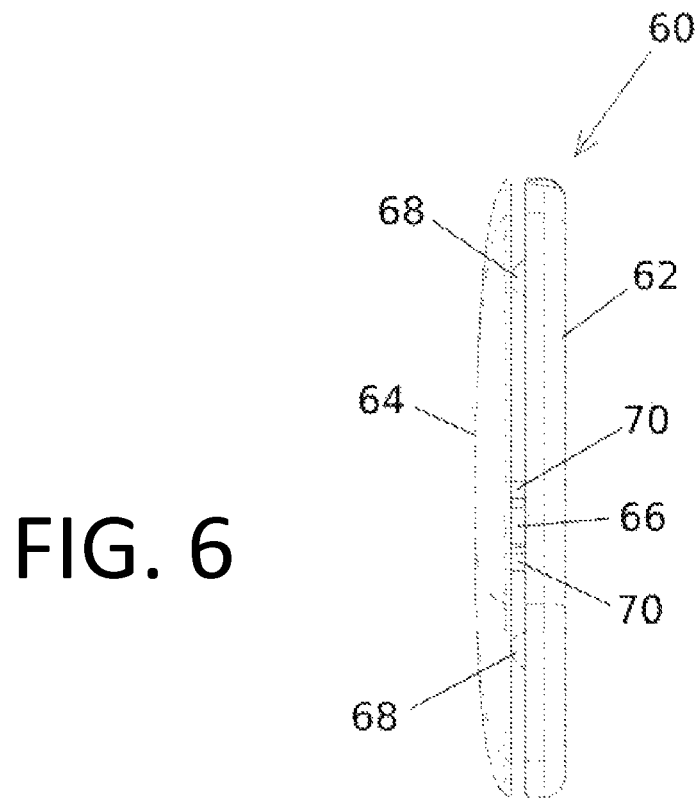
FIG. 6 is a side view of one embodiment of the slap switch control device.

FIG. 6 depicts an embodiment of slap switch control device 60. A plurality of electrically parallel switches 68, positioned between base 62 and slap pad 64, provide a control signal when any one switch or any combination thereof is depressed in the act of answering or hanging up cellular telephone calls or for starting, stopping, and resuming music. Said control signal may comprise establishing a closed circuit between a pair of contacts that was previously an open circuit, said control signal comprise establishing an open circuit between a pair of contacts that was previously a closed circuit, or said control signal may comprise an electrical signal of any other type. The location of switches 68 near the perimeter of slap pad 64 facilitates their operation when force is applied to slap pad 64 at irregular positions or angles. Switches 68 are normally held open by, for example, springs or elastomeric materials of construction that apply a force opposing the internal electrical switch contacts (not pictured). Support guides 66 and 70 hold base 62 and slap pad 64 together and, in one embodiments, allow for a limited degree of swiveling to close one or more electrical switches 68 when slap switch control device 60 is activated by the user. In one embodiment, support guides 66 and 70 allow for a range of swiveling sufficient to permit rotation of slap pad 64 with respect to base 62 while still holding them at the desired separation.

An important advantageous characteristic of this configuration is that all of the plurality switches 68 are in parallel with each other, meaning that activation of just one of the plurality of switches 68 provides continuity across the slap switch control device 60. In this manner, all switches are equal and provide identical functionality. Successful activation of the slap switch control device 60 does not require application of a force at any particular location on the face of the switch to activate any particular one of the plurality switches 68. A force applied at any point on slap pad 64 will operate at least one of the plurality of switches, and usually more than one of said switches, to provide the desired control system output from the slap switch control device 60. As an additional advantage, the presence of multiple switches provides a high degree of redundancy in the event of failure of any one switch. The location of the electrically parallel switches 68 and the is selected to ensure that more than one of the switches 68 are activated by a force applied to slap pad 64 of the slap switch control device 60. In somewhat similar configurations known in the art, failure of any one mechanical switch may render the entire switch assembly defective, and the configuration of this invention solves that problem. The slap switch control device 60 of the present invention provides ease of use and enhanced reliability by permitting activation force to be applied anywhere on the face of the switch and redundancy in the event of switch failure for all but the most irregular activation forces.

In one embodiment not shown, the plurality of electrically parallel switches 68 may be replaced with conductors or conductively-coated surfaces on all or substantially all of the inner-facing surfaces of base 62 and slap pad 64. Preferably, between 80% and 100% of said inner-facing surfaces would comprise conductive properties. When these surfaces come in contact with each other as the result of a force applied to the slap pad 64 of slap switch control device 60, electrical continuity is provided across said control device in a manner identical to that provided by the activation of one or more of the plurality of electrically parallel switches 68 in the previous embodiment. In essence, this embodiment represents the case where up to an infinite number of switches are deployed within slap switch control device 60 because contact at any point between the conductive inner surfaces of base 62 and slap pad 64, and not just at the discrete locations of any one of the plurality of electrically parallel switches 68, will achieve activation of the slap switch control device 60. Either or both of said inner-facing conductors or conductively-coated surfaces may be stippled or comprise an irregular surface that provides preferred points of contact with the opposing surface.

In addition to providing control commands via activation of any of a plurality of electrically parallel switches 68 or via contact between opposing conducting surfaces, slap switch control device 60 may be configured to provide control functions by additional means, including but not limited to rotation of slap pad 64 with respect to base 62. This is particularly applicable to embodiments where slap switch control device 60 is circular in shape. Rotating the slap pad in one direction, preferable clockwise, may be used to raise the audio volume of the cellular telephone or other portable electronic device while rotation in the opposite direction may be used to lower the volume of said device. This control function may be achieved by providing one or more (in the case of stereo audio) variable resistor(s) affixed to either slap pad 64 or base 62 with the rotatable wiper of said variable resistor(s) operatively connected to the other. Rotation of one portion of the switch with respect to the other would provide a continuously variable voltage between the maximum and minimum positions. When the analog audio signal voltage(s) provided to slap switch control device 60 by a cellular telephone or other portable electronic device are impressed across the one or more variable resistors, a simple, effective, and easily accessible volume control may be provided. In one embodiment, a variable DC voltage may be provided based on the relative positions of slap pad 64 or base 62 and said DC voltage communicated to additional circuitry within slap switch control device 60 for other control or command purposes. In one embodiment, an optical sensor, comprising in one non-limiting example a light emitting diode (LED) and photo transistor, is affixed to the inner surface of either slap pad 64 or base 62 and an optically encoded disc is affixed on the other inner surface proximate to said optical encoder, the optical sensor may be utilized to ascertain the relative positions of the two proximate surfaces and provide one or more control or command function(s) according to said position, any change in relative position, or the velocity or acceleration associated with said change in relative position.

Wires 54 and 72 (not shown on FIG. 6) are attached to base 62. In one embodiment, wires 54 and 72 may be replaced on slap switch 60 by connector jacks compatible with connector plugs on wires 54 and 72, permitting said wires to be detached as desired. Any number of other connector jacks may be installed on slap switch control device 60 for the purpose of providing or receiving electrical or mechanical (contact opening and closing) signals of any kind, including but not limited to audio and control signals.

Figure 7:
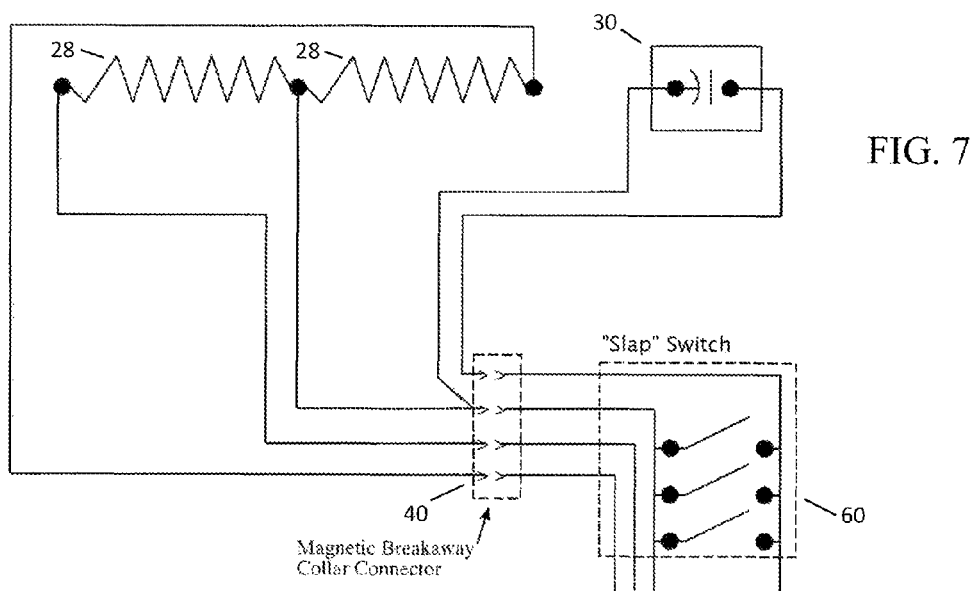
FIG. 7 is a schematic wiring diagram of the embodiment depicted in FIG. 1.

FIG. 7 shows the schematic wiring of the embodiment presented in FIG. 1 and FIG. 2. Slap switch control device 60 is shown with three parallel electrical switches, which may be appropriate for a triangular-shaped slap switch. This is not to be construed as limiting the present invention, as any reasonable number of parallel switches, or a single switch, may be used with this device. Cellular telephone plug 74 comprises electrical contacts 90A, 90B, 90C, and 90D that mate with internal electrical contacts of a cellular telephone. The contacts 90A-D are electrically connected to speakers 28 and microphone 30 via insulated conductors in the manner shown. Slap switch control device 60 is a resilient switch that remains in the open position, as shown, when not pressed by the user to activate. When slap switch control device 60 is pressed, at least one of the plurality of parallel electrical switches 68 close to complete an electrical circuit and, in one embodiment, electrically connect the leads across microphone 30. This activates functions on the cellular telephone. Specifically, it answers and hangs up telephone calls, or starts, stops, and resumes music play. Use of slap switch control device 60 may also activate other functions on the phone, such as starting and stopping the streaming of music to speakers 28.

Figure 8:
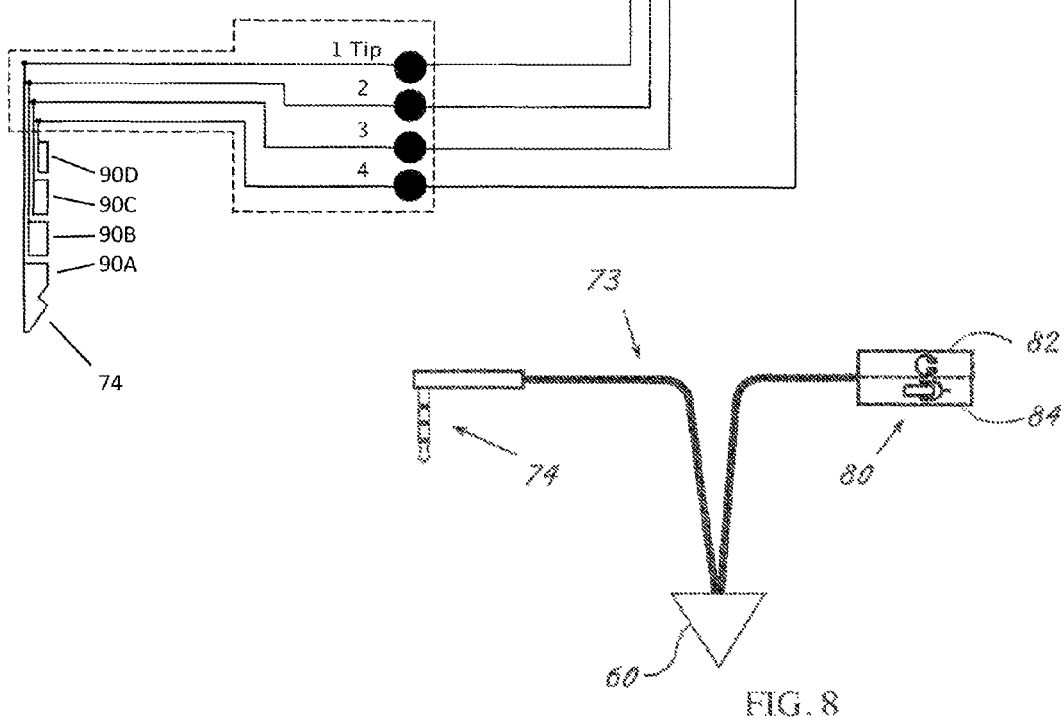
FIG. 8 is a schematic diagram of the embodiment depicted in FIG. 3.

FIG. 8 depicts adapter 73 with a standard 3.5 mm, four connector male plug for insertion into many cellular telephone models. At the opposite end of adapter 73 is female duplex plug 80 (or, alternatively, two female simplex plugs) for connection to a variety of standard headsets. Slap switch control device 60 is included to facilitate starting, stopping, and resuming music play, and answering and ending cellular telephone calls.

Figure 9:
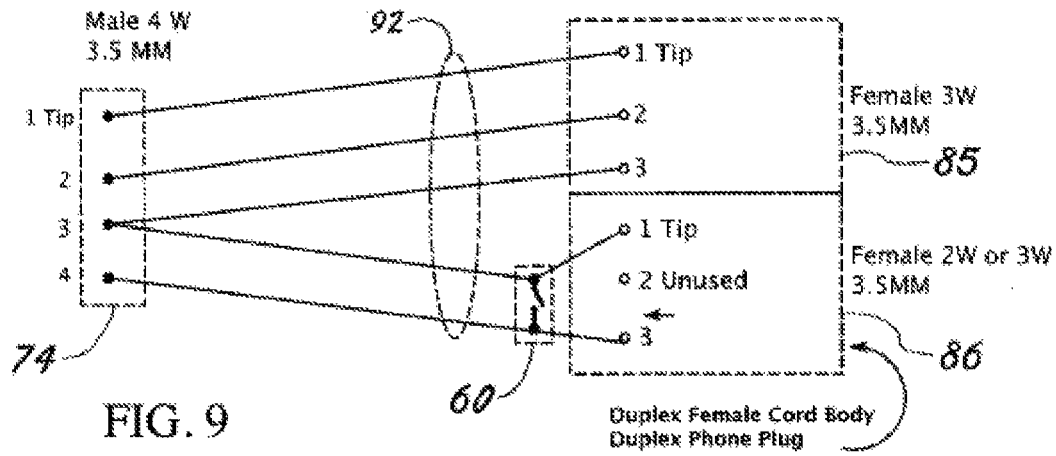
FIG. 9 is a schematic wiring diagram of the embodiment depicted in FIG. 3 utilizing a duplex-type speaker and microphone connection.

FIG. 9 depicts the wiring system for connection of a cellular telephone to a standard headset, or alternatively to one or more speakers and a microphone with standard 3.5 mm male plugs. Cellular telephone plug 74 is electrically connected to speaker plug 85 and microphone plug 86 via insulated conductors 92, in the manner shown. Female duplex plug 80 comprises speaker plug 85 and microphone plug 86, which are both standard 3.5 mm female jacks. Slap switch control device 60 may be activated to momentarily short the leads across the microphone terminals, as described herein.

Figure 10:
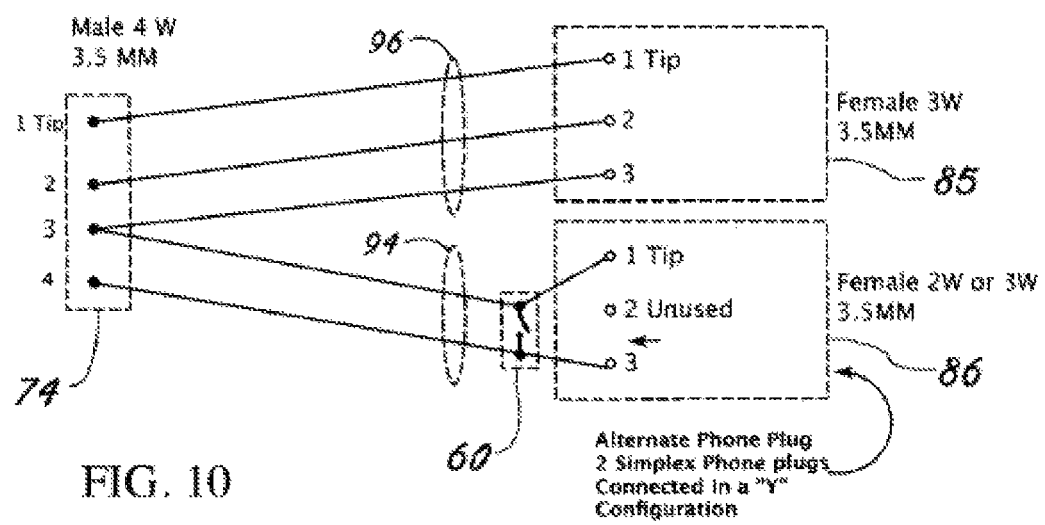
FIG. 10 is a schematic wiring diagram of the embodiment depicted in FIG. 3 utilizing two simplex-type speaker and microphone connections.

FIG. 10 shows an electrically equivalent arrangement as that depicted in FIG. 9, but with speaker plug 85 and microphone plug 86 arranged in a simplex configuration. Cellular telephone plug 74 is electrically connected to speaker plug 85 via insulator conductor 94, and to microphone plug 86 via insulated conductor 96.

For operation of the embodiment described above, cellular telephone plug 74 is inserted into a cellular telephone female audio input/output connection. Alternatively, a patch cable may be used to translate a nonstandard cellular telephone connection to a standard 3.5 mm plug, and cellular telephone plug 74 may then be inserted into a female plug of the patch cable. Head garment 20 is placed over the user's head, and continuity of the electrical contacts 50A-50D of breakaway connector 40 is achieved when breakaway switch half 42 is engaged with breakaway switch half segment 43. Many modern cellular telephones can send an audio (e.g., music) signal to speakers 28. Generally, an audible signal will be transmitted on top of the audio signal when the user receives an incoming telephone call. The user may then momentarily activate slap switch control device 60 to answer the call, and activate it again to hang up. Alternatively, when the cellular telephone is being utilized as a portable music player, slap switch control device 60 is used to start, stop, and resume music play.

Operation for the configuration depicted in FIG. 2 is similar. Male speaker and microphone plugs are inserted into female speaker plug 85 and microphone plug 86, respectively. The operation of slap switch control device 60 is as described above.

In one embodiment, one or more of the wired connections depicted in FIGS. 1-10 are replaced via one or more wireless connections between the various external components and devices, including the cellular telephone or other portable electronic device. A portion of said connections may be wired connections and another portion may be wireless connections. In one embodiment, all connections between the various components of the control system may be wireless connections.

Cellular telephones and other portable electronic devices normally comprise Bluetooth® capability as an inherent feature of the device, and in one embodiment, one or more external components of the headset system may communicate with one or more cellular telephones or portable electronic device(s) using said protocol. Similarly, most portable electronic device also comprise the ability to establish a networked communication link via Wi-Fi® as a means of providing access to external sites or resources including the Internet. In one embodiment, the slap switch control device 60 may comprise Wi-Fi® communication capability, permitting a portable electronic device to connect to the system via said protocol(s). In one embodiment, the slap switch control device 60 may comprise an 802.11 wireless access point (WAP) to which one or more portable electronic devices may connect using said industry-standard protocols. In one embodiment, a portable electronic device may use Wi-Fi® to establish a link to an external wireless access point, thereby acquiring external network access, and subsequently provide external network access to slap switch control device 60 via a second wireless communication connection according to any of the known or later-developed wireless communication protocols such as Bluetooth®, ZigBee®, and the like.

In one embodiment, the slap switch control device 60 depicted in FIG. 4 and FIG. 6 comprises one or more communication modules each comprising one or more wireless communication ports to provide wireless communication capability according to one or more of the wireless communication protocols described above. For example, modules may be provided for Bluetooth®, ZigBee®, NFC, or any of the Wi-Fi® 802.11 protocols as desired. More than one module may be provided for any one protocol or any number of modules may be provided for each of any number of different protocols as desired.

In one embodiment, slap switch control device 60 comprises connector jacks used for wired connection to external components, including portable electronic devices, when wired operation desired and further comprises one or more wireless communication modules, each comprising one or more wireless communication ports, for wireless connection to external components, including portable electronic devices, when wireless operation is preferred. Preferably, the control system comprising external devices and components is configured to permit wireless operation whenever a wired connection is not in use. When a wired connection is established by inserting a compatible plug into a particular connector jack, any wireless function associated with that particular connector previously operative is disabled until said plug is removed. For example, a wireless Bluetooth® communication module may be in use to connect to a Bluetooth® headset worn by a user. In the event the Bluetooth® headset fails from a depleted battery, for example, the user may choose to plug a wired headset into the appropriate connector jack in the slap switch control device 60, thereby establishing a wired connection, and doing so would terminate operation of the Bluetooth® communication module in slap switch control device 60 until said plug was removed.

In one illustrative embodiment not limiting upon the scope of this disclosure in any manner, the slap switch control device 60 may establish a first wireless communication connection from a wireless communication port therein to the user's cellular telephone or other portable electronic device via the Bluetooth® protocol. Simultaneously, the slap switch control device 60 may establish a second wireless communication connection from a second wireless communication port therein to a headphone device comprising a built-in microphone and further comprising Bluetooth® protocol communication functionality. In this configuration, signals are relayed to and from the cellular telephone or other portable electronic device from and to the headphones via the slap switch control device 60 whenever the user supplies the appropriate control commands to activate said mode. Primarily, audio output from the cellular telephone or other portable electronic device, such as music or the incoming audio from a telephone call, is communicated to slap switch control device 60 via the first wireless communication connection, which audio is then communicated to the headphone device via the second wireless communication connection. Similarly, an audio signal obtained from the headset microphone is communicated to slap switch control device 60 via the second wireless communication connection, which audio is then communicated to the cellular telephone or other portable electronic device via the first wireless communication connection. Such audio signal obtained from the headset microphone may comprise audio from the user to be sent to the distant party in a telephone conversation. Alternately, such audio signal obtained from the headset microphone may comprise voice commands directed to the cellular telephone or other portable electronic device when said device is configured to receive and respond to said voice commands. In this instance, slap switch control device 60 serves as a translator between the first and second wireless communication connections, and all audio signals within the system pass through and are distributed and controlled by said control device.

The control system of this invention provides additional functionality not known in the prior art. As described in detail above, a principal function of slap switch control device 60 is to provide control functionality particularly directed toward the cellular telephone or other portable electronic device. These control functions include but are not necessarily limited to answering telephone calls, starting, stopping, and resuming music play, adjusting the audio signal volume supplied by the cellular telephone or other portable electronic device, and the like. In one or more of the wired embodiments discussed above, these control signals are communicated from slap switch control device 60 to the cellular telephone or other portable electronic device via conductors within the cable disposed between the two devices. The audio signal is communicated via separate conductors within the same cable, said separate conductors comprising a separate communication path between the two devices.

In an embodiment comprising both wired and unwired connections, the audio signals may be communicated by a suitable wireless communication connection while the control functions may be communicated via a wired connection. In a preferred embodiment comprising only wireless communication connections, control signals from the slap switch control device 60 may be generated, injected, and communicated via any wireless communication connection to any device sharing said wireless communication connection.

As one non-limiting example, most Bluetooth®-compatible devices are configured to respond to control commands transmitted via Bluetooth®, such as when a cellular telephone may be answered or a call terminated by pressing a button on a connected Bluetooth® headset. The control system of the present invention may be configured to allow such controls generated by either device in wireless communication with slap switch control device 60. However, control commands generated in this manner do not advantageously benefit from the additional capability provided by slap switch control device 60 disclosed above. Accordingly, slap switch control device 60 may be further configured to translate any number or pattern of switch activations into Bluetooth®-compatible commands that are injected into the wireless communication connection and communicated to any device in wireless communication therewith. For example, a single momentary activation of slap switch control device 60 may be translated into the appropriate Bluetooth® protocol command and injected into the wireless communication connection between the slap switch control device 60 and the cellular telephone to direct that the call be answered. During the course of the telephone call, the wireless communication connection between the slap switch control device 60 and the cellular telephone will be active to communicate audio from the phone to the user's speakers and from the user's microphone to the cellular telephone, but when the user desires to terminate the call, a second activation of the slap switch control device 60 may similarly command said control device to generate an appropriate Bluetooth®-compatible command and inject and communicate said command to the cellular phone via the same wireless communication connection previously used to transmit audio of the call.

Similarly, the Bluetooth®-compatible headphone of this example may also receive commands from slap switch control device 60. Said headphones may comprise features such as output audio volume or microphone sensitivity, as two non-limiting examples, that are remotely adjustable via Bluetooth® commands provided by a connected device. The slap switch control device 60 may be further configured to generate, inject, and communicate, via the shared wireless communication connection, an appropriate Bluetooth®-compatible command to said headphones to perform any function which the headphones are configured to accept and execute.

In one embodiment, slap switch control device 60 may simultaneously establish more than one wireless communication connection with more than one similar device. For example, slap switch control device 60 may be configured to simultaneously connect to more than one set of wireless headphones via the same or different wireless protocols. In this manner, the audio provided by a single cellular telephone or other portable electronic device may be simultaneously received by more than one user, or more than one user may simultaneously participate in a telephone call in a "conference" mode. Additionally, in this example, slap switch control device 60 may be configured to provide control functionality for only one set of wirelessly connected headphones or to provide simultaneous control functionality for all wirelessly connected headphones. Similar control of devices other than headphones is envisioned and enabled by this disclosure as well.

As disclosed above, the slap switch control device 60 is not limited to wireless communication via the Bluetooth® protocol; it may be configured to communicate with and provide control commands to external devices via any known or preferred wireless communication protocol, including those enumerated above and any of similar functionality.

Slap switch control device 60 may be further configured to generate any number of other control signals based on the number of switch activations within a prescribed period of time, the duration of any switch activations, any combination of switch activations and their durations forming a prescribed pattern, or any other manner in which switch activations may be distinguished from each other. As described above, one short activation may be used to command a cellular telephone device to answer a call when no call is currently in progress, and the same short switch activation may be used to terminate any call in progress. Any number of other combinations are envisioned by this disclosure, For example, one long switch activation may be used to generate a command to increase the audio output volume of the cellular telephone or other portable electronic device; the volume may continually increase as long as the slap pad on the slap switch control device 60 remains depressed. A series of short activations may be used to reduce the audio output volume of the cellular telephone or other portable electronic device; as long as multiple short activations continue to be sensed by slap switch control device 60, it may continue to generate, inject, and communicate a Bluetooth® command for the cellular telephone or other portable electronic device to continually reduce volume until the desired level is achieved. These examples are provided only to disclose the nature of one aspect of this invention and are neither limiting or all-encompassing. A person of ordinary skill in the art will immediately recognize that any number of other combinations or configurations follow immediately from this disclosure.

To the extent that slap switch control device 60 comprises any active circuitry or requires power or any other reason, said device may comprise a power source such as a battery and battery charging circuitry. Preferably, said battery is a high capacity rechargeable battery, such as but not limited to one of any of lithium-ion (Li-on), nickel cadmium (NiCd), nickel metal hydride (NiMh), lithium ion polymer (Li-on polymer), or nickel lithium (NiLi). Slap switch control device 60 may also comprise an additional charging port or jack into which a suitable DC power source of a specified voltage and current capacity may be applied to charge the battery. In one embodiment, slap switch control device 60 further comprises a USB jack through which the battery may be charged. In one embodiment, slap switch control device 60 comprises a photovoltaic charging panel which converts light energy into a DC voltage which may be used to charge a battery or store charge in a capacitor to be used for the operation of said device. When any particular embodiment of the slap switch control device 60 requires electric power for operation, said device is preferable equipped with a power switch or alternate means, such as providing a certain series of commands via the slap pad, to turn the device on and off.

Additionally, if slap switch control device 60 comprises any computing resources including but not limited to hardware, firmware, software, processor(s), memory or memories, or any embedded peripherals required to provide or support any of the functionality described herein, said USB jack may provide access to said computing components for any useful purpose such as configuration, management, troubleshooting, and updating. In addition, slap switch control device 60 may be configured to allow configuration, management, troubleshooting, and updating via any other wired or wireless connection available in said device Since other modifications and changes to the novel control system will be apparent to those skilled in the art, the invention is not considered limited to the description above for purposes of disclosure, and covers all changes and modifications which do not constitute departures from the true spirit and scope of this invention.

What is claimed is:

1. An apparatus for controlling a plurality of personal electronic devices, said apparatus comprising:
   A. a control device comprising two or more wireless communication ports and a switch assembly, said switch assembly comprising:
      1. a non-movable surface and a movable surface, said movable surface configured to displace toward said non-movable surface when a force is applied thereto; and
      2. one or more momentary electrical switches or contacts in mechanical communication with said non-movable and said movable surface such that said displacement of the movable surface toward said non-movable surface activates at least one of said one or more momentary electrical switches or contacts;
   wherein said control device is capable of:
   B. establishing a first wireless communication connection between a first of said two or more wireless communication ports and a first of said plurality of personal electronic devices and a second wireless communication connection between a second of said two or more wireless communication ports and a second of said plurality of personal electronic devices;
   C. communicating a signal from said first of said plurality of personal electronic devices to said second of said plurality of personal electronic devices via said first wireless communication connection and said second wireless communication connection;
   D. upon said activation of at least one of said one or more momentary electrical switches or contacts, generating, injecting, and communicating at least one wireless control signal into (i) said first wireless communication connection to control said first personal electronic device, (ii) said second wireless communication connection to control said second personal electronic device, or (iii) said first wireless communication connection to control said first personal electronic device and said second wireless communication connection to control said second personal electronic device, wherein said at least one wireless control signal is compatible with the wireless protocol of the communication connection into which it is injected.

2. The apparatus of claim 1 wherein each of said plurality of personal electronic devices comprise one of any of a cellular telephone, a non-cellular mobile phone, a satellite phone, a cordless wireless phone, a walkie-talkie, a two-way portable radio device, an electronic music player, a wireless headphone, a wireless speaker, and a wireless microphone.

3. The apparatus of claim 1 wherein said two or more wireless communication ports are capable of establishing a wireless communication connection compatible with at least one of any of Bluetooth®, ZigBee®, Wi-Fi®, IEEE 802.11, or Near Field Communication wireless communication protocols.

4. The apparatus of claim 1 wherein a wireless control signal generated by either of said first or second of said plurality of personal electronic devices may be communicated to the other of said first or second of said plurality of personal electronic devices via the two or more wireless communication ports of said control device.

5. The apparatus of claim 1 comprising more than two wireless communication ports wherein said control device is further configured to establish the first wireless communication connection between the first of said more than two wireless communication ports and the first of said plurality of personal electronic devices, the second wireless communication connection between the second of said more than two wireless communication ports and the second of said plurality of personal electronic devices, and a third of said more than two wireless communication ports and a third of said plurality of personal electronic devices.

6. The apparatus of claim 5 further capable of:
A. communicating a wireless control signal generated by said first of said plurality of personal electronic devices to said second of said plurality of personal electronic devices via said first and said second wireless communication connections;
B. communicating a wireless control signal generated by said second of said plurality of personal electronic devices to said third of said plurality of personal electronic devices via said second and said third wireless communication connections;
C. communicating a wireless control signal generated by said third of said plurality of personal electronic devices to said first of said plurality of personal electronic devices via said third and said first wireless communication connections; or
D. any combination of A, B, or C above.

7. The apparatus of claim 1 wherein said at least one wireless control signal generated, injected, and communicated by said control device as a result of said activation of at least one of said one or more momentary electrical switches or contacts is determined by the number of switch activations within a prescribed period of time, the duration of any switch activations, or any combination of switch activations and their durations forming a prescribed pattern.

8. The apparatus of claim 1 wherein said signal communicated from said first of said two or more personal electronic devices to said second of said two or more personal electronic devices comprises an audio signal.

9. The apparatus of claim 8 wherein said control device further comprises
A. audio circuitry configured to provide at least one of any of automatic gain control, compression, limiting, noise gating, and equalization; or
B. audio circuitry capable of adjusting at least one of any of the parameters of audio input level, audio output level, audio dynamic range, audio signal to noise ratio, background noise threshold, audio frequency passband defined by high pass filter(s) and low pass filter(s), notch filtering, or the relative gain of any audio frequency range with respect to any other audio frequency range(s); or
C. both A and B above.

10. The apparatus of claim 8 wherein said control device serves as a translator between said first and second wireless communication connections and all audio signals pass through and are distributed and controlled by said control device.

11. A method of controlling a plurality of personal electronic devices, said system comprising:
A. using a control device comprising two or more wireless communication ports and a switch assembly, establishing a first wireless communication connection between a first of said two or more wireless communication ports and a first of said plurality of personal electronic devices and a second wireless communication connection between a second of said two or more wireless communication ports and a second of said plurality of personal electronic devices;
B. using said control device, communicating a signal from said first of said plurality of personal electronic devices to said second of said plurality of personal electronic devices via said first wireless communication connection and said second wireless communication connection;
C. upon activation of said switch assembly, using said control device to generate, inject, and communicate at least one wireless control signal into (i) said first wireless communication connection to control said first personal electronic device, (ii) said second wireless communication connection to control said second personal electronic device, or (iii) said first wireless communication connection to control said first personal electronic device and said second wireless communication connection to control said second personal electronic device, wherein said at least one wireless control signal is compatible with the wireless protocol of the communication connection into which it is injected.

12. The method of claim 11 wherein said switch assembly comprises: A. a non-movable surface and a movable surface, said movable surface configured to displace toward said non-movable surface when a force is applied thereto; and B. one or more momentary electrical switches or contacts in mechanical communication with said non-movable and said movable surface such that said displacement of the movable surface toward said non-movable surface activates at least one of said one or more momentary electrical switches or contacts.

13. The method of claim 11 wherein each of said plurality of personal electronic devices comprise one of any of a cellular telephone, a non-cellular mobile phone, a satellite phone, a cordless wireless phone, a walkie-talkie, a two-way portable radio device, an electronic music player, a wireless headphone, a wireless speaker, and a wireless microphone.

14. The method of claim 11 wherein the step of establishing the first wireless communication connection and the second wireless communication connection comprises a step of establishing first and second wireless communication connections compatible with at least one of any of Bluetooth®, ZigBee®, Wi-Fi®, IEEE 802.11, or Near Field Communication wireless communication protocols.

15. The method of claim 11 further comprising an additional step wherein a wireless control signal generated by either of said first or second of said plurality of personal electronic devices is communicated by said control device to the other of said first or second of said plurality of personal electronic devices via said first and second wireless communication connections.

16. The method of claim 11 wherein said control device comprises more than two wireless communication ports and the step of establishing said first wireless communication connection and said second wireless communication connection also comprises establishing a third wireless communication connection between a third of said more than two wireless communication ports and a third of said plurality of personal electronic devices.

17. The method of claim 11 comprising one or more additional steps of:
A. communicating a wireless control signal generated by said first of said plurality of personal electronic devices to said second of said plurality of personal electronic devices via said first and said second wireless communication connections;
- B. communicating a wireless control signal generated by said second of said plurality of personal electronic devices to said third of said plurality of personal electronic devices via said second and said third wireless communication connections;
- C. communicating a wireless control signal generated by said third of said plurality of personal electronic devices to said first of said plurality of personal electronic devices via said third and said first wireless communication connections; or
- D. any combination of A, B, or C above.

18. The method of claim 11 wherein said signal communicated from said first of said plurality of personal electronic devices to said second of said plurality of personal electronic devices comprises an audio signal.

19. The method of claim 18 wherein said at least one wireless control signal is operative to control the operation of either or both of said first or second of said plurality of personal electronic devices by at least one of any of (i) answering telephone calls, (ii) starting, stopping, or resuming music play, (iii) adjusting microphone sensitivity, or (iv) adjusting at least one of any of the parameters of audio input level, audio output level, audio dynamic range, audio signal to noise ratio, background noise threshold, audio frequency passband defined by high pass filter(s) and low pass filter(s), notch filtering, or the relative gain of any audio frequency range with respect to any other audio frequency range(s).

20. The method of claim 11 further comprising a step of determining the at least one wireless control signal to be generated, injected, and communicated by said control device based on a number of switch activations within a prescribed period of time, the duration of any switch activations, or any combination of switch activations and their durations forming a prescribed pattern.

* * * * *